United States Patent [19]

Foster

[11] 4,077,212

[45] Mar. 7, 1978

[54] HYDROSTATIC TRANSMISSION CONTROL

[75] Inventor: Kenneth William Samuel Foster, Prestbury, England

[73] Assignee: Renold Limited, Manchester, England

[21] Appl. No.: 767,891

[22] Filed: Feb. 11, 1977

[30] Foreign Application Priority Data

Feb. 21, 1976 United Kingdom .......... 6944/76

[51] Int. Cl.² ............................................ F16H 39/46
[52] U.S. Cl. ............................ 60/431; 60/445; 60/468; 60/493
[58] Field of Search .......... 60/431, 445, 468, 487, 60/488, 489, 493, 494

[56] References Cited

U.S. PATENT DOCUMENTS

| | | | |
|---|---|---|---|
| 3,186,162 | 6/1965 | Pignolet et al. .................. | 60/431 |
| 3,214,911 | 11/1965 | Kempson ........................ | 60/431 |
| 3,369,360 | 2/1968 | DeBiasi ...................... | 60/493 X |
| 3,986,358 | 10/1976 | Hoffmann ........................ | 60/468 |

*Primary Examiner*—Edgar W. Geoghegan
*Attorney, Agent, or Firm*—Flynn & Frishauf

[57] ABSTRACT

A hydrostatic transmission comprising a closed loop system incorporating a hydraulic pump and a hydraulic motor driven by the pump has an accelerator for the motor drive shaft which sets the maximum delivery pressure of the pump, and control means which acts to vary the relative volume displacement of the pump and the motor to maintain the pump delivery pressure at the maximum value determined by the setting of the accelerator. Thus, the closed loop system maintains a substantially constant maximum pressure throughout the flow range, and since the output torque of the motor drive shaft is proportional to this system pressure a true acceleration control is achieved. The relative value displacement of the pump and the motor may be influenced by the low pressure of delivery of the pump on overrun of the motor shaft and by a spring loaded braking valve adjustable by a pedal control to provide for braking of the motor drive shaft.

31 Claims, 12 Drawing Figures

HYDROSTATIC TRANSMISSION CONTROL

PRIOR APPLICATION

Priority, Great Britain, Feb. 21. 1976, Application No. 6944/76.

The present invention relates to hydrostatic transmission control.

By hydrostatic transmission is meant a transmission in which an hydraulic pump is driven to provide hydraulic fluid under pressure to operate an hydraulic motor, the hydraulic fluid exhausting from the motor being returned to the low pressure side of the pump. Commonly the pump and the motor are connected in a closed loop, and a booster pump is provided to replace hydraulic fluid leakage from the closed loop system.

In order to control such a transmission, it is known to vary the speed ratio between the pump and the motor by varying the relative volume displacement of hydraulic fluid of the pump and the motor. The volume displacement of the pump and/or the motor may be varied to vary the speed ratio between the pump and the motor.

A control member coupled to vary the volume displacement of the pump and/or the motor, and thereby the speed ratio of the transmission, varies the velocity of the motor drive provided at the transmission output. In other words, such a control member provides velocity control over the transmission.

A hydrostatic transmission having a velocity control and applied to drive a vehicle requires a nonconventional vehicle driving technique on the part of the vehicle driver, and certain problems arise. For example, accurate control at very slow vehicle speed, and smooth progressive braking on overrun using the transmission, are difficult to achieve. also, the natural reaction of a vehicle driver to press harder on the "go" pedal when faced with an up gradient is inconsistent with the requirement of a velocity controlled hydrostatic transmission which requires a reduction in speed to obtain increased torque.

The present invention aims broadly to provide a hydrostatic transmission having an acceleration control.

Thus, in accordance with the present invention a hydrostatic transmission comprises a main hydraulic pump and a hydraulic motor, one at least of which is a variable displacement device the volume displacement of which is variable by the adjustment of a control member associated with the device, the hydraulic motor being connected to be driven by hydraulic fluid under high pressure delivered by said pump, the motor having an output drive shaft to provide the output torque from the transmission, said pump and said motor being connected in a closed loop system, there being a hydraulic fluid output line connecting the output side of said pump to said motor to deliver the high pressure working fluid to said motor and a hydraulic fluid return line connecting said motor to the return side of said pump to return to the pump hydraulic fluid under low pressure exhausting from said motor, a booster pump connected to withdraw hydraulic fluid from a hydraulic fluid reservoir and to deliver same to said closed loop system to make up any hydraulic fluid leakage from said closed loop system, an accelerator for said output drive shaft, said accelerator being displaceable to vary the maximum delivery pressure of hydraulic fluid attainable by said main hydraulic pump, and control means for automatically adjusting said control member to maintain the pressure of hydraulic working fluid delivered by said main hydraulic pump substantially contant at the maximum value determined by the setting of said accelerator in any particular setting thereof throughout the flow range of said variable displacement device from its minimum flow condition to its maximum flow condition whereby the torque of said output shaft increases with displacment of said accelerator to increase the maximum delivery pressure of hydraulic fluid attainable by said main hydraulic pump and the torque of said output shaft decreases with displacement of said accelerator to decrease the maximum delivery pressure of hydraulic fluid attainable by said main hydraulic pump.

The control means in a hydrostatic transmission in accordance with the invention as defined in the immediately preceding paragraph sets the maximum closed loop system pressure to be achieved by the pump during operation of the transmission. The closed loop system pressure is proportional to the output torque of the output drive shaft of the hydraulic motor so that by controlling the system pressure, an acceleration control is achieved, the pump always seeking to operate to maximize the flow of hydraulic fluid in the closed loop system within the pressure limit set by the control means.

This may be contrasted with a velocity control where the flow of hydraulic fluid is set by the control member and the pressure of the hydraulic fluid fluctuates independently of the setting of the control member to provide the necessary transient torque to achieve the flow of hydraulic fluid demanded by the control member setting.

In one means of carrying the present invention into effect, the control means comprises an automatic constant pressure controller to maintain said control member in such a position that the pump output pressure of said main hydraulic pump is matched to a reference pressure determined by the load of a control spring, the control spring loading being adjustable by said accelerator.

Braking means for said output drive shaft may be included, said braking means being operable to influence the positioning of said control member, on overrun of said output drive shaft, to vary the volume displacement of said variable displacement device as a function of the low pressure of delivery of hydraulic fluid by said main hydraulic pump to said motor, thereby to provide a braking effect on said drive shaft.

The braking means may comprise a spring loaded braking valve in said closed loop system between said main hydraulic pump and said motor, said braking valve being operable to impose a variable restriction on the flow of hydraulic fluid in said closed loop system.

The braking means may alternatively comprise (or it may additionally include) means biasing said control member towards a position in which the volume displacement of said main hydraulic pump is at a minimum relative to the volume displacement of said motor when the pressure of hydraulic fluid delivered to said motor by the main hydraulic pump falls below the input pressure of hydraulic fluid returned to the main hydraulic pump from said motor.

In a further means of carrying the present invention into effect, the control means comprises a variable pressure valve to control the boost pressure of hydraulic fluid delivered to said closed loop system by said booster pump, the setting of said variable pressure valve being adjustable by said accelerator, and control actuator means to adjust said control member in response to the boost pressure to maintain the output pressure of said main hydraulic pump substantially proportional thereto said control actuator means comprising servo means powered by the boost flow of hydraulic fluid delivered by said booster pump and discharging said fluid to said reservoir.

In a hydrostatic transmission in accordance with the present invention, as defined in the immediately preceding paragraph, the control flow of hydraulic fluid to effect the acceleration control is confined in the boost circuit. The control flow of hydraulic fluid is that part of the boost flow of hydraulic fluid which would normally be returned to the hydraulic fluid reservoir in any event. The acceleration control does not therefore, in this case, impose any additional power loss or inefficiency on the transmission itself.

In this case also, braking means for said output drive shaft may be included, the braking means comprising a braking control valve to control the rate of discharge of hydraulic fluid from said servo means to said hydraulic fluid reservoir.

The main hydraulic pump may be operable to pump fluid in one direction only from the return side of the pump to the output side of the pump, said motor may be reversible by reversing the direction of flow of hydraulic working fluid through the motor and a change of direction valve may be provided in said closed loop system between said main hydraulic pump and said motor to reverse the direction of flow of hydraulic working fluid through said motor. In this way, a transmission in accordance with the present invention is rendered reversible.

Alternatively, the main hydraulic pump may be reversible to pump fluid in either direction, in which case a change-direction lever mechanism is included between the control member and the accelerator.

Said variable displacement device may be said main hydraulic pump, said motor may be a variable volume displacement motor and said control means may act also to adjust the volume displacement of the motor to maintain this at a maximum up to a maximum flow of hydraulic working fluid from said main hydraulic pump at any particular setting of said accelerator to accelerate a given load on said output drive shaft, said control means thereafter acting to reduce the volume displacement of said motor to enable said motor to continue to accelerate said load on said output drive shaft.

At a setting of the accelerator to decelerate the load on said output drive shaft, i.e. on overrun of the output drive shaft, so as to provide braking, the reverse sequence applies using a variable volume displacement motor which is adjusted by the accelerator in the manner defined in the immediately preceding paragraph.

Specific embodiments of the present invention will now be described by way of example, and not by way of limitation, with reference to the accompanying drawings in which.

Figure 1A:
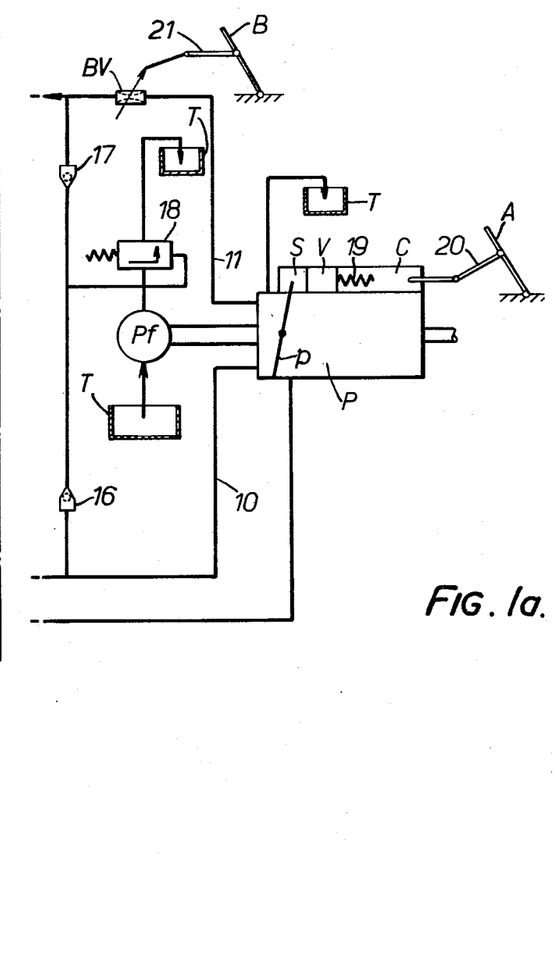
FIGS. 1a and 1b together form a diagrammatic illustration of a hydrostatic transmission in accordance with the present invention, these Figures being joined at the broken lines towards the centre of the combined Figures.
Figure 1B:
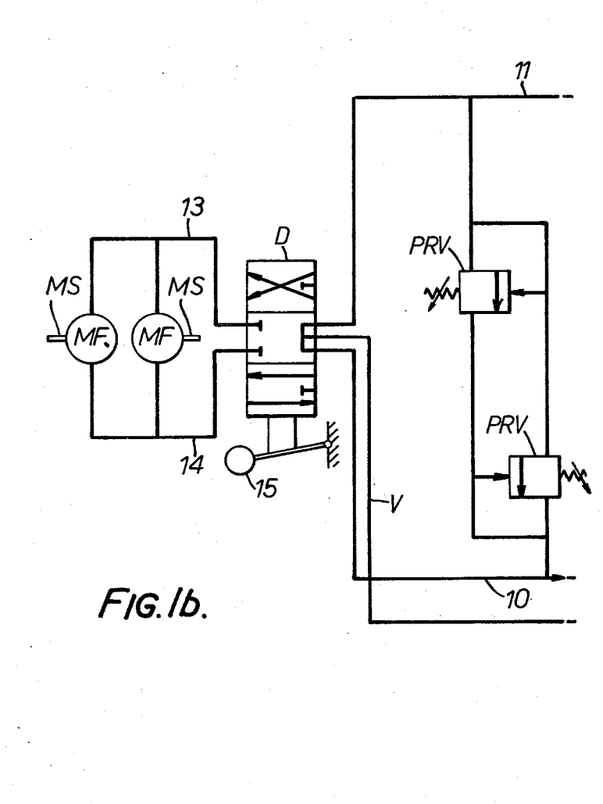

With reference now to the accompanying drawings, referring first to FIGS. 1a and 1b, fixed volume displacement hydraulic motors MF shown in FIG. 1b are assumed to be coupled to drive a pair of driving wheels respectively of a vehicle via output drive shafts of the motors MS. The motors are arranged in parallel in an hydraulic circuit supplied by a direction control valve D which is illustrated in a neutral position isolating the motors MF and short circuiting a variable volume displacement pump P (see FIG. 1a) with a vent V which directs a boost flow of hydraulic fluid, in excess of that required at the inlet of the pump P in the main pump circuit, into the pump case to cool the pump, the flow from the pump case being directed into a reservoir for hydraulic fluid from which the boost flow of hydraulic fluid is drawn by a booster pump Pf.

In FIGS. 1a and 1b, the reservoir, and the arrangements for providing the boost flow of hydraulic fluid are conventional. The booster pump Pf supplies hydraulic fluid into one or other of the hydraulic fluid pump lines 10 and 11 leading respectively to the pump inlet and from the pump outlet, via non-return valves 16 and 17. A pressure relief valve 18 sets the boost pressure as appropriate.

Boost may also be provided to the hydraulic fluid motor lines 13, 14 leading respectively to the motor inlets and from the motor outlets in a corresponding manner again via non-return valves (not shown).

Cross line pressure relief valves PRV are provided as shown in FIG. 1b on the pump side of the direction control valve D. These might alternatively or additionally be placed across the lines 13, 14 on the motor side of the valve D.

The direction control valve D has a manual control 15 for adjusting the valve into neutral, forward and reverse drive positions respectively. Instead a hydraulically, electrically or pneumatically operated servo control may be substituted. In its forward drive position, the valve connects the line 11 with the line 13 and the line 14 with the line 10 to form a closed loop system containing the pump P and the motor MF.

The pump P has an automatic constant pressure controller C and the pump P is of the axial piston swash plate type having a swash plate $p$ providing for increase in volume flow of the pump with increase in swash plate angle with respect to a plane normal to the axes of the pistons and vice versa, in well know fashion per se. The controller C acts automatically via a servo motor S to maintain the angle of the swash plate $p$ such that the pump output pressure is matched to a reference pressure set on one face of a shuttle valve V by a control spring 19 on the controller C. The force of the control spring 19, setting the reference pressure, is in turn determined by an accelerator pedal A connected to the control spring 19 by a suitable linkage 20, depression of the pedal increasing the control spring force to increase the reference pressure and vice versa.

With this arrangement, observing that acceleration of the vehicle is proportional to the applied torque at the vehicle driving wheels, and in a hydrostatic transmission such as is being described, torque is proportional to the hydraulic fluid pressure at the output of the pump P, it may be seen that the controller C sets the maximum transmission pressure of the hydraulic fluid and the pump P then seeks to maximize the hydraulic fluid flow in the closed loop system P, 11, D, 13, MF, 14, D, 10 within the maximum pressure limit set by the controller C. As the accelerator A is depressed, the maximum transmission pressure setting is steadily increased and thereby, the applied torque, and the vehicle accordingly accelerates in accordance with conventional vehicle driving practice. To achieve effective transmission braking on overrun of the output drive shafts MS when the motors MF endeavour to drive the pump P and the pressure of hydraulic fluid rises in line 10 on the return side of the pump, the pump P is required to reduce its volume output. During overrun, the low pump delivery pressure in line 11 is sensed by the controller C. In order to reduce the volume output of the pump under these conditions, a spring loaded braking valve BV is provided in the line 11 to restrict the flow of hydraulic fluid in the line in response to the depressing of a brake pedal B connected directly by a suitable linkage 21 to load the valve spring. By restricting the flow in the line 11 the pressure of fluid in the line 11 is caused to increase and the controller C is thereby persuaded to adjust the angle of the swash plate $p$ to reduce the volume flow of the pump P accordingly.

The valve BV may alternatively be placed in the pump return line 10, itself to provide a braking effect. Instead of, or in addition to, providing the valve BV, the controller C can be biased to adjust the angle of the swash plate $p$ to reduce the volume flow of the pump P to zero when the output pressure in line 11 is allowed to fall below the pressure in the line 10. This may readily be achieved via a servo motor subject to the differential pressure of fluid in the lines 10 and 11 respectively. An example of this is the servo motor SM hereinafter described with reference to FIG. 4.

The control C may alternatively act on volume flow control members associated with variable volume displacement motors substituted for the motors MF to vary the relative volume displacement of the pump P and the motors by varying the volume displacement of the motors to maintain the delivery pressure of the pump substantially constant at the maximum value determined by the setting of the accelerator A. Braking may be effected in part as already described, if a variable volume displacement pump is also employed. However, to effect initial braking, the controller C would be biased to adjust the control members associated with the motors MF, under the overriding control of a braking control valve similar to the valve BCV hereinafter to be described, towards a position in which the volume displacement of the pump P is at a minimum relative to the volume displacement of the motors. Thereafter, the volume displacement of the pump P would be reduced to provide additional braking via the valve BV as before.

Such an arrangement is, in general, the converse of a system hereinafter to be described with reference to FIG. 8 but controlling the maximum transmission pressure of the closed loop directly.

Figure 2:
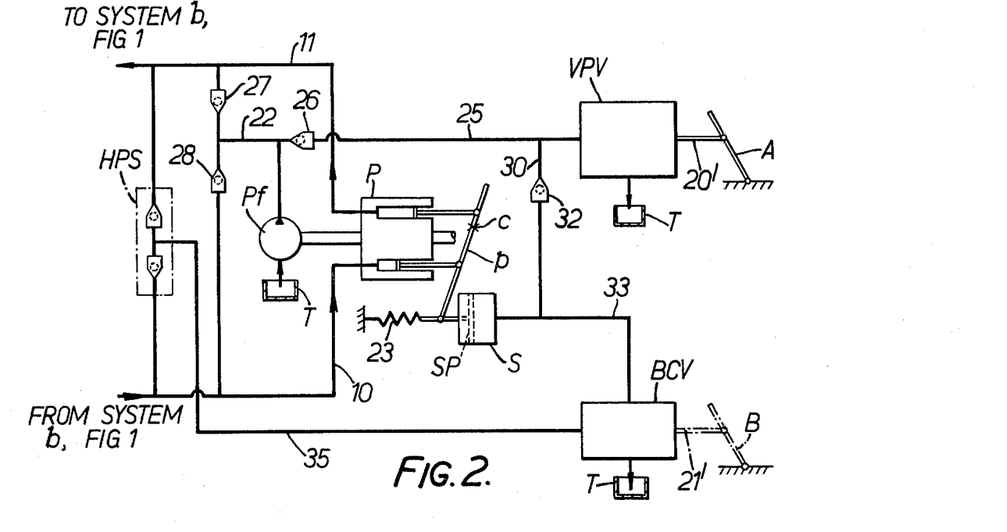
FIGS. 2, 3, 4 and 5 are diagrammatic illustrations of parts of further embodiments of hydrostatic transmission in accordance with the present invention and each showing a different arrangement which may be adopted in replacement of the part of the hydrostatic transmission shown in FIG. 1a, that is to say, to the right hand side of the broken line connections in the combined FIGS. 1a and 1b.

Referring now to FIG. 2, this illustrates a further simple means of setting the maximum transmission pressure of the hydraulic fluid in the line 11 in response to the position of the accelerator A. The controller C is dispensed with. Also, instead of providing a fixed pressure relief valve 18 across the booster pump Pf to provide a fixed boost pressure as in the conventional boost pressure arrangement provided in the hydrostatic transmission of FIGS. 1a and 1b, the boost pressure is, in this embodiment, controlled by a variable pressure valve VPV, the setting of which is under the control of the accelerator A, as indicated by the linkage 20' in FIG. 2, the pressure setting of the valve VPV being increased as the accelerator is depressed. The internal geometry of the pump P is now arranged with the swash plate $p$ pivoted off-centre at $c$ so that the pump piston forces acting on the pump swash plate $p$, again regarded as the pump volume flow control member, are resisted by the pressure of hydraulic fluid at the boost pressure and acting in a servo cylinder S on a servo piston SP connected to adjust the angle of the swash plate $p$ in response to the variable boost pressure in the sense to increase the volume flow of the pump as the boost pressure increases, and vice versa. Spring 23 is also provided acting on the swash plate $p$ in the sense to move the swash plate to a zero angle.

Hydraulic fluid at the boost pressure, controlled by a non-return valve 26 and by the valve VPV, is supplied into the closed loop transmission system P, 11, D, 13, MF, 14, D, 10 via a boost line 22 and non-return valves 27 and 28. Additionally, hydraulic fluid at a lesser pressure proportional to the boost pressure is supplied into the servo cylinder S through the non-return valve 26, lines 25 and 30 and a non-return valve 32 the excess fluid escaping from the cylinder S back to the reservoir T via an hydraulic fluid line 33 in a controlled fashion hereinafter described. The swash plate $p$ is, in this case, acted upon by three control forces to set the volume flow of the pump. First is the force of the servo motor S.SP directly controlled by the setting of the accelerator A. Second is a force resulting from the closed loop system pressure in the line 11 and the line 10 due to the off-centre positioning of the pivot $c$. Third is the force of the spring 23.

With this arrangement the pump output pressure is maintained approximately proportional to the boost pressure set by the valve VPV and therefore the motors MF are again driven to cause the vehicle to accelerate in accordance with conventional driving practice as the accelerator A is depressed.

In the FIG. 2 embodiment, the braking system employs a braking control valve BCV which controls the rate at which the excess flow of hydraulic fluid supplied to the servo motor S.SP can escape back to the reservoir T via the hydraulic fluid line 33. The reservoir T is indicated at various places in the diagram of FIG. 2 but it is to be understood that it is the same reservoir in each case. The setting of the valve BCV is controlled by the brake pedal B via the linkage 21' so as to open as the pedal is depressed. As the valve opens the rate at which the hydraulic fluid escapes from the servo motor S.SP is increased and the force of the servo motor acting on the pump swash plate $p$ produced whereby the swash plate tends to move to its zero swash position.

The valve BCV is regulated normally by the fluid pressure acting in the high pressure side of the closed loop system via a high pressure selector valve HPS connected across the lines 10 and 11 and feeding a high pressure hydraulic line 35 communicating with the valve.

In the arrangement of FIG. 2, the second force acting on the pump swash plate $p$, is derived from the closed loop system pressure by placing the swash plate pivot $c$ off-centre.

Figure 3:
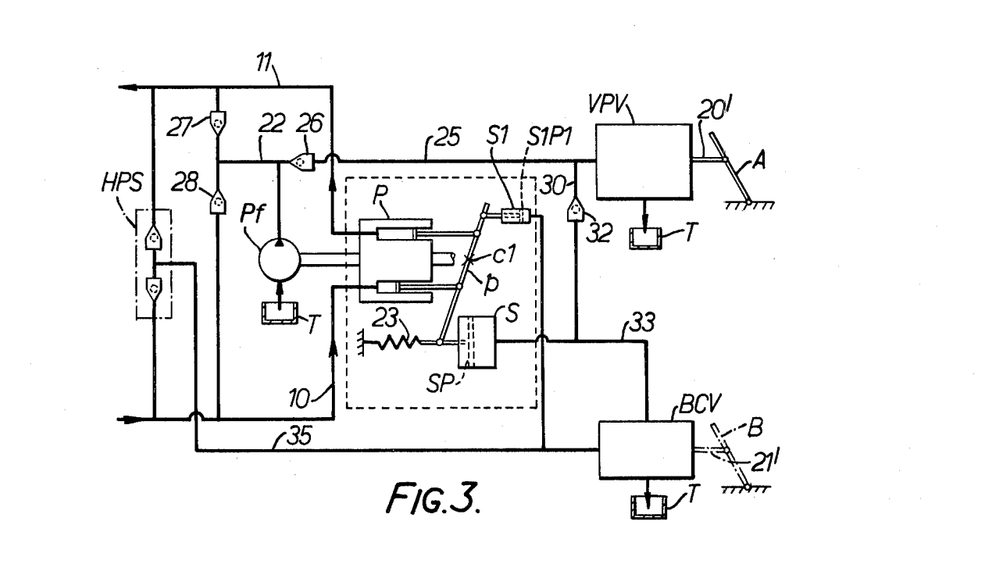

Referring now to FIG. 3, this illustrates an arrangement very similar to that illustrated in FIG. 2. The swash plate $p$ of the pump P in the FIG. 3 arrangement is pivoted centrally on the pump axis at $c^1$ and the second force is derived, in this case, directly from the high pressure side of the closed loop system via the valve HPS and the hydraulic line 35 and communicated to the cylinder S1 of a further servo motor S1S1P1 the servo piston S1P1 of which is connected to adjust the angle of the swash plate $p$ in opposition to the servo motor S.SP.

The arrangement of FIG. 3 is in all other respects similar to that described with reference to FIG. 2.

Figure 4:
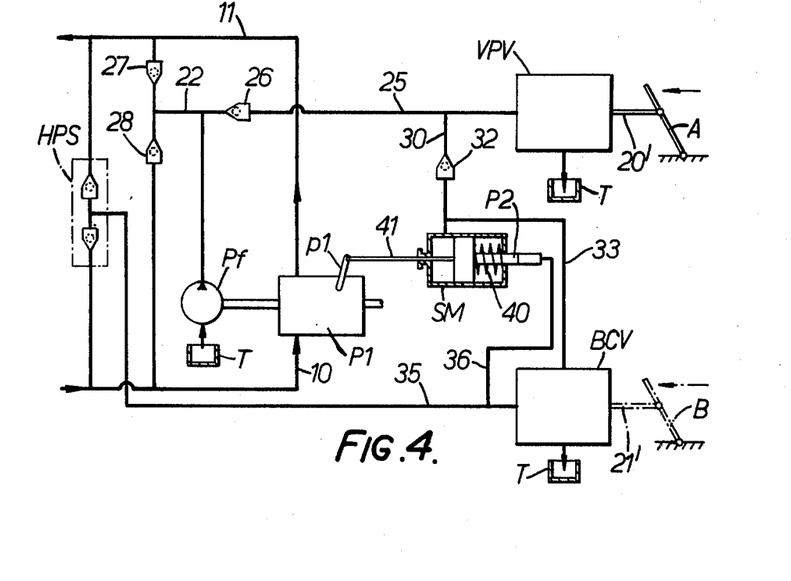

In the arrangement of FIG. 4, the swash plate pump is replaced with a variable volume pump P1 of any other known or convenient kind having a volume displacement control member represented by the pivoted lever $p1$. The lever $p1$ is under the control of a servo motor SM having a differential servo piston P2 subject on its opposite end faces respectively to the fluid pressure communicated via the line 30 and non-return valve 32 to the piston end face of larger area, and the system pressure in the high pressure side of the closed loop system communicated to the piston end face of smaller are via the valve HPS, the line 35 and a further hydraulic line 36. The spring force constituting the third force previously described is in this case provided by a spring 40 acting on the piston P2. The piston P2 is connected to adjust the lever $p1$ by a suitable linkage 41.

The arrangement of FIG. 4 is in all other respects similar to that described with reference to FIG. 2.

In a modification of the FIG. 2 arrangement, the spring 23 is dispensed with and an equivalent spring force derived instead from the usual pump piston return springs.

Referring again to FIG. 2, the pressure of hydraulic fluid in the servo cylinder S is approximately proportional to the closed loop system pressure in the line 10 or the line 11 during braking. The pressure of hydraulic fluid in the servo cylinder S could therefore be used to regulate the valve BCV instead of the pressure acting in the high pressure side of the closed loop system.

Figure 5:
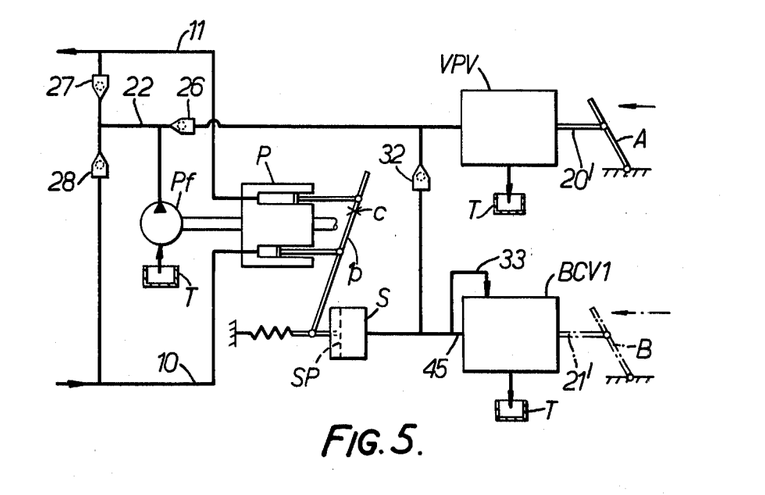

This is shown in FIG. 5 where the valve HPS and the fluid line 35 are dispensed with and instead, an additional fluid line 45 is provided communicating the servo cylinders with the valve BCV1.

The line 45 replaces the high pressure fluid line 35 to provide fluid under pressure to the valve BCV1 to regulate the valve. Of course, the springs and pressure areas, and so on, used in the valve BCV1 would need to be different to those used in the high pressure signalled valve BCV of FIG. 2 but the operation of the valve is otherwise the same as previously described.

The hydrostatic transmissions described with reference to FIGS. 3 and 4 may be modified in respect of the valve BCV as described with reference to FIG. 5 but in these cases, the valve HPS and the high pressure line 35 need to be retained to provide the high pressure fluid signal to the servo motor S1S1P1 and SM respectively in the two figures.

Figure 6:
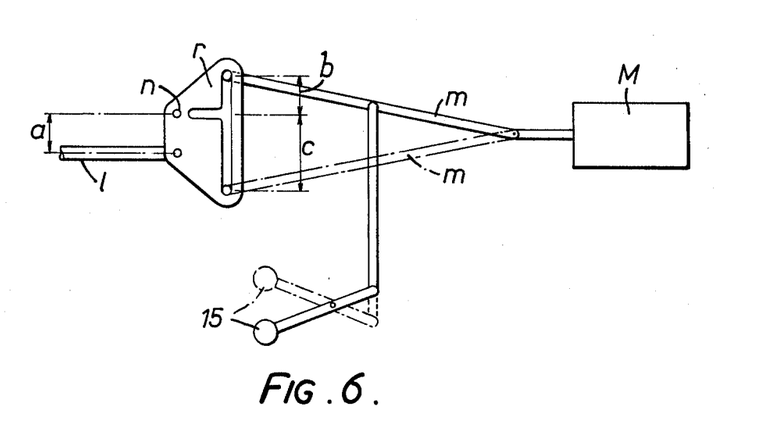
FIG. 6 illustrates an alternative detail of construction which may be adopted in the transmissions of FIGS. 1 to 5.

The embodiments of the invention so far described have all employed a change of direction valve D (see FIG. 1b) to obtain reverse drive. This enables a pump P or P1 to be used having a positive stop to set the minimum swash plate angle of the pump and preferably, this stop would be adjustable to set zero swash with good accuracy. An overcentre swash plate pump might however be used to obtain reverse drive, the change of direction valve D being dispensed with. In this event, a mechanism such as is illustrated in FIG. 6 may be provided to reverse the movement of the linkage $l$ connecting the pump volume flow control member such as $p$ or $p1$ with the control means M therefor, as previously described. This arrangement has the advantage that the linkage ratios $a/b$ and $a/c$ in the mechanism can be made different to allow different forward and reverse drive characteristics. Thus, the dimensions $a$, $b$ and $c$ are the moment arms of the link pivots for the linkage $l$ and further interconnecting link $m$ about a pivot $n$ pivoting a plate $r$ for rocking movement. The linkage $l$ is connected to the plate $r$ at a pivot fixed at distance $a$ from the pivot $n$. The link $m$ has alternative positions shown in full line and broken line respectively in which its pivotal connection with the plate $r$ is spaced a distance $b$ or $c$ from the from the pivot $n$ on opposite sides thereof. A change direction lever 15 is adjustable to move the link in pivotal connection between its alternative positions.

Figure 7:
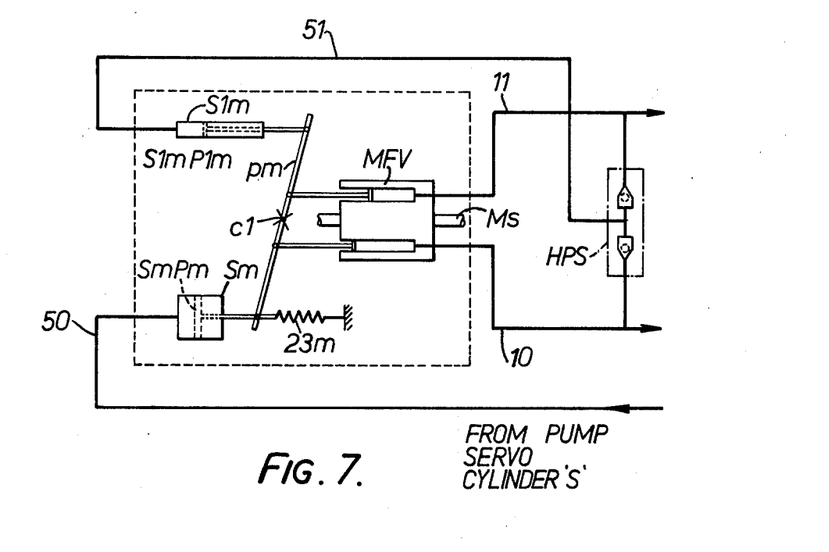
FIG. 7 is a diagrammatic illustration showing a different arrangement which may be adopted in replacement of the part of the hydrostatic transmissions shown in FIG. 1b to combine with any of the arrangements of FIGS. 1a, 2, 3, 4 and 5 to form still further embodiments of hydrostatic transmission in accordance with the present invention.

FIG. 7 illustrates a motor MFV to be an axial piston type variable volume motor having a swash plate $pm$ centrally pivoted at $c1$ and controlled by a system of forces and by means generally as described for the pump P in FIG. 3. Thus a servo motor SmSmPm opposed by a spring 23m is powered by hydraulic fluid from the pump servo motor cylinder S through an hydraulic line 50 to adjust the swash plate $pm$ of the motor in opposition to a servo motor S1mS1mP1m powered by high pressure fluid supplied via the valve HPS through an hydraulic line 51.

Instead, the swash plate $pm$ may be pivoted offcentre and controlled by a system of forces and by means generally as described for pump P in FIG. 2 or by control means generally as described for the pump P1 and labelled SM in FIG. 4 or again, by a system of forces and by means generally as described for pump P in FIG. 5.

The geometry of the motor and control mechanism within broken line box in FIG. 7 is biased to give a force balance acting on the swash plate $pm$ of the motor or on the control member setting the volume flow of the motor and corresponding to the lever $p1$ in FIG. 4, in favour of a maximum volume flow setting when the two servo motors of the control or the differential servo piston corresponding with the piston P2 in FIG. 4 of the control are presented with the pressures decided by the force balance within the pump.

In other words, for example, the pump and control mechanism within the broken line box in FIG. 3 and the motor and control mechanism within the broken line box in FIG. 7 may be dimensionally identical except that the motor servo cylinder $Sm$ is made smaller in diameter than the pump servo cylinder S.

As in FIG. 1b, a change direction valve D may be incorporated in the circuit of FIG. 7 to allow reverse operation and/or a neutral condition of the motor MF in that figure.

Figure 8:
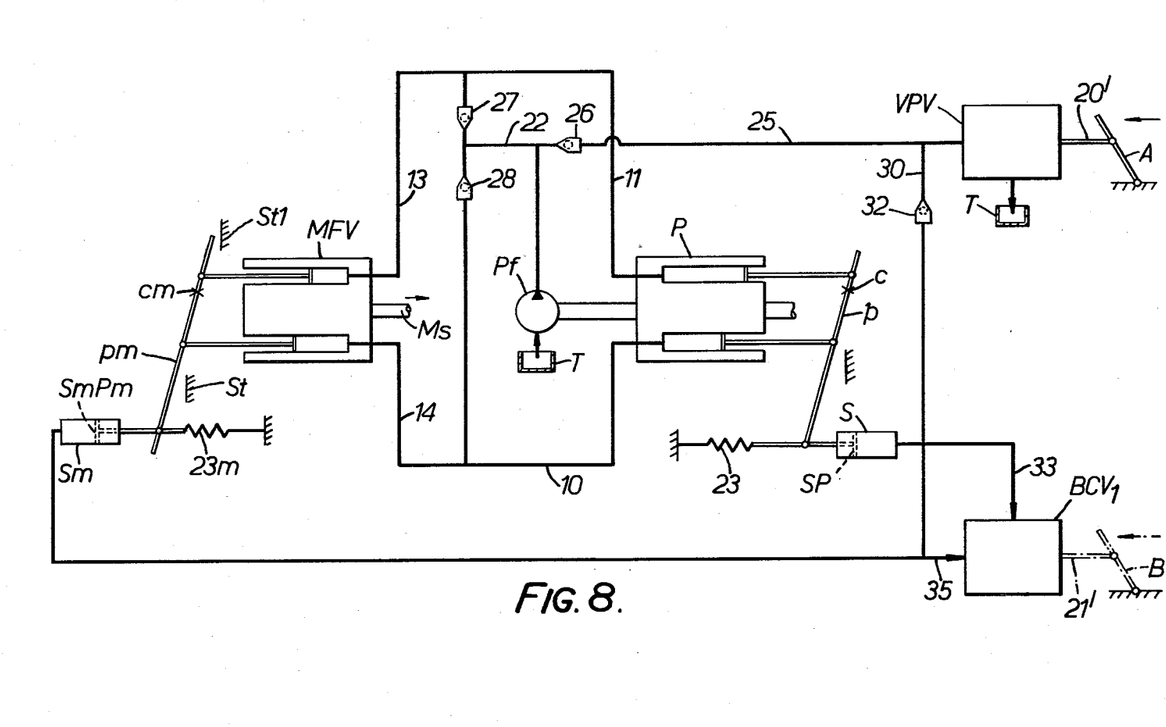
FIG. 8 is a diagrammatic illustration of a still further embodiment of hydrostatic transmission in accordance with the present invention.

FIG. 8 illustrates a further hydrostatic transmission which operates in accordance with the principle explained with reference to FIG. 7, but using a pump and control therefor as described with reference to FIG. 5. Thus in FIG. 8, parts corresponding with parts already described with reference to FIGS. 5 and 7 are indicated by the same reference letters or numerals. The system illustrated in FIG. 8 shows only the basic elements of the system and cross line relief valves such as the valves PRV shown in FIG. 1b and a change direction valve such as the valve D shown in FIG. 1b may be incorporated without substantially changing its mode of operation.

The motor MF is assumed to provide a vehicle drive in conjunction with a further motor or motors in parallel therewith.

The pump P is assumed to be driven by an internal combustion engine. With the vehicle at rest but with the engine running and the pedals A and B not actuated, the swash plate $p$ of the pump will be at zero swash angle and the swash plate $pm$ of the motor MF will be at its maximum swash angle. If the accelerator A is now depressed to some arbitrary position, to set a boost control pressure on the valve VPV, the pump swash plate $p$ will move to cause the pump to generate a flow of hydraulic fluid in the line 11 sufficient to raise a pressure in the line sufficient to balance the forces acting on the pump swash plate. This line pressure in the line 11 will more than balance the force generated by the servo motor $SmSmPm$ and the motor swash plate $pm$ will stay at maximum swash. As the load on the motor is accelerated, the swash angle of the pump swash plate $p$ will be continuously increasing to provide more and more flow in the line 11 while maintaining the pressure in the line. The load therefore will continue to accelerate until a vehicle speed is reached corresponding to the maximum flow from the pump at the motor's maximum volume setting. The pump, at this point, has reached the limit of its ability to adjust the flow in the line 11 to maintain the pressure set on the valve VPV. The load momentarily stops accelerating therefore and the pressure in the line 11 starts to fall below the set pressure. When a lower level of pressure is reached in the line 11 at which the forces acting on the motor swash plate just become unbalanced, the motor swash plate begins to reduce its swash angle in an endeavour to maintain the balance of forces acting upon it. The movement of the motor swash plate towards a smaller swash angle further accelerates the load, and such load acceleration continues until a natural power or force balance point is reached as dictated by external constraints or, until the motor swash plate engages a pre-set stop indicated at $St$ in FIG. 8.

During this sequence it is assumed that the accelerator A has been held depressed in its same arbitrary position throughout.

In order to slow the vehicle down, the accelerator is released and the boost pressure set on the valve VPV is allowed to fall to a minimum value. The valve BCV1 now takes over. As the pressure of fluid in the servo motor $SmSmPm$ tries to fall, the forces acting on the motor swash plate $pm$ will no longer balance and in consequence, the swash angle of the plate will start to increase. The resulting retardation of the load will cause a pressure of hydraulic fluid to build up in the return line 10. The pressure of fluid in the servo motor $SmSmPm$ will depend on the balance of forces acting on the swash plate $pm$ and the rate at which it changes its swash angle depends on the rate at which hydraulic fluid is enabled to escape from the servo cylinder $Sm$. The non-return valve 32 prevents this fluid returning to the valve VPV. It has therefore only one escape route via the valve BCV1. This valve is pressure sensitive and controls the rate of discharge of the fluid from the servo cylinder $Sm$ and therefore the rate of deceleration of the load.

Because the balance forces generated by the pressure of fluid acting in the servo motors $Sm$ and S are different, the pump swash angle will stay at maximum while the motor swash angle is regulating. When the servo cylinder $Sm$ has discharged sufficiently to allow thhe swash plate of the motor to reach its maximum swash stop $St1$, the servo pressure will be able to fall to the level necessary to allow the pump swash plate to start to reduce its swash angle. Finally, the load will come to rest when the pump reaches zero swash and the line and servo pressures have reached their controlled minimum values. If during this sequence a more rapid retardation of the vehicle's movement is required, the brake pedal B may be depressed to over-ride the pressure sensitivity of the valve BCV1 and allow the fluid to be discharged from the servo cylinder $Sm$ at a greater rate. This in turn allows the swash plate of the motor to increase its swash angle more rapidly to provide more rapid braking of the vehicle.

Figures 9A, 9B:
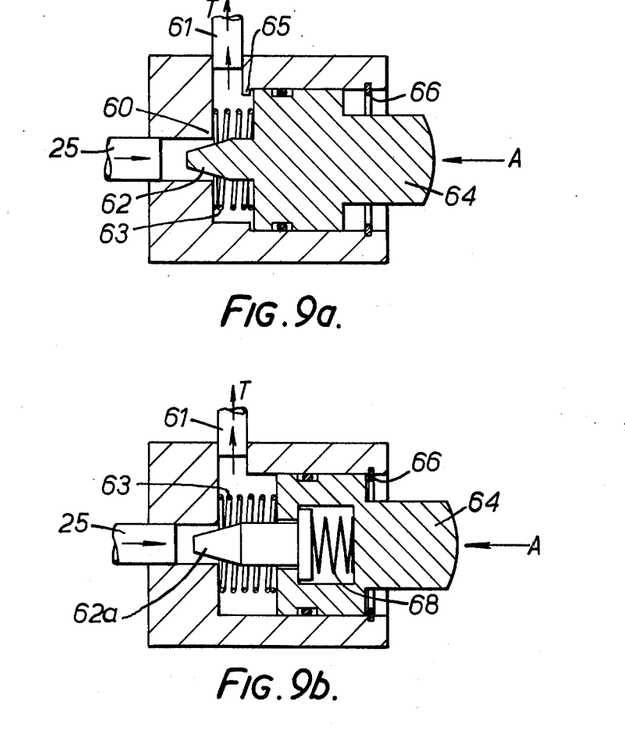
FIGS. 9a, 9b and 10 show details of certain of the valves which may be used in the systems of the earlier figures.

FIGS. 9a and 9b show two different forms of the valve VPV.

Referring to FIG. 2 for example, boost pressure supplied from the booster pump $Pf$ is assumed to be drawn from the reservoir T and supplied into the hydraulic line 25 by the pump. The line 25 communicates with a plunger controlled orifice 60 (see FIG. 9a) of the valve BCV through which hydraulic fluid at boost pressure escapes back to the reservoir through a fluid line 61 in FIG. 9a. The plunger 62 is a simple frusto conical member set by the accelerator. A via linkage 20 against the action of a return spring 63 to control the area of the orifice 60 and therefore the restriction in the valve BCV. Although a simple frusto conical member is described, the plunger 62 may take any number of alternative forms, depending upon the specific characteristics needed for the control system.

Instead of being set mechanically via the linkage 20, the plunger 62 may regulate the fluid pressure in the line 25 in response to an hydraulic or electrical or pneumatic or any other input signal from the accelerator A.

The plunger 62 is carried by a piston 64 displaceable between fixed stops 65 and 66 which determine the minimum and maximum orifice areas of the orifice 60 and therefore the maximum and minimum boost control pressure to be set at the valve VPV. The arrow at the right hand side in FIG. 9a indicates the signal applied to set the plunger position by displacement of the piston 64.

The valve described with reference to FIG. 9a is useful for systems which use a constant boost pump flow from a fixed displacement boost pump driven at constant speed. The minimum orifice area decided by the stop 65, is the only protection against over pressurising the boost circuit.

FIG. 9b shows a development of the valve described with reference to FIG. 9a in which the plunger 62a is spring loaded with respect to the piston 64 by a further spring 68. The intention here is that the spring 68 should exert a sufficient force on the plunger to prevent its movement relative to the piston until the boost pressure reaches some predetermined maximum value. For pressures above this maximum, the plunger then acts like a pressure relief valve, giving way to limit the boost pressure to the predetermined maximum.

Such a need can arise when starting from cold when the viscosity of the hydraulic fluid may be higher than normal, or when a variable boost flow is used generated by say a fixed displacement pump driven at a variable speed.

If the pump P and the booster pump are both driven from a variable speed internal combustion piston engine in FIG. 2, the fluid flow through the valve VPV increases with increase in the engine speed for a given setting of the valve, if the hydrostatic transmission is operating at a fixed condition e.g. with the vehicle slowly climbing a steady gradient. This would cause an increase of fluid pressure in the line 11 and therefore the vehicle to accelerate.

It may be desirable to be able to change the speed of the engine without changing the vehicle speed. This can be achieved if the spring 68 instead of being set to relieve at a maximum pressure, is set to relieve at a much lower pressure equivalent to the minimum boost pressure for the systems normal operating range and designed with a suitable low spring rate to maintain the set boost control pressure over a modest range of flow variations.

Figure 10:
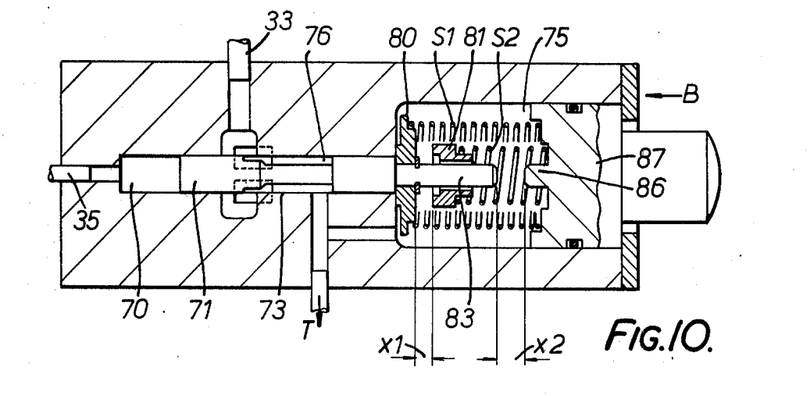

FIG. 10 shows one possible form for the valve BCV and will be described in the FIG. 2 configuration. The valve is pressure sensitive to the pressure in the high pressure side of the closed loop system communicated through the line 35 to provide a high pressure signal acting in a space 70 on one end face of a valve spool 71 displaceable in a bore 73. The opposite end face of the spool is exposed to drain pressure in a space 75. The spool has a circumferential groove 76 which controls the rate of escape of fluid from the servo cylinder S via the line 33 to the reservoir T.

The signal pressure acts on the spool 71 against two springs S1 and S2 housed in the space 75. The outer spring S1 resists movement of the spool over an initial part of its displacement under the action of the signal pressure until the gap $x1$ between a spring abutment plate 80 for spring S1 fixed on the spool and a spring abutment collar 81 for the spring S2 slidable on a stop extension 83 of the spool, is closed. The spring S1 is a relatively soft spring requiring only a relatively low signal pressure to compress it through the distance $x1$ to close off a substantial part of the orifice area controlled by the spool and available to the hydraulic fluid in the line 33 for its escape to the reservoir T.

On closing of the gap $x1$ the action of the spring S2 is added to that of the spring S1 to resist the displacement of the spool by the signal pressure.

At a limiting signal pressure value after displacement through the distance $x2$, the stop extension 83 engages a stop rod 86 on a piston 87 slidable in a bore constituting the space 75 under the action of displacement of the brake pedal B. The piston 87 forms the opposite end abutment for the springs S1 and S2.

If it is assumed that the pump P is driven at a constant speed and the motor(s) MF are fixed displacement motors, then the spool 71 is positioned by the balance of forces between the springs S1 and S2 and the pressure of fluid in the line 35. The maximum orifice area for the escape of pressure fluid through the valve BCV is only available when the pressure in line 35 is at a minimum. This occurs when the vehicle is at rest and when the vehicle has reached its maximum desired speed and it is required that vehicle braking should be initiated. At this point when the pressure in the line 35 falls to its minimum, and virtually no power is being transmitted between the pump and the motor(s), the only force available to initiate braking is the force of the spring 23. This can generate only a relatively small pressure in the line 33 and therefore a relatively large orifice area is required at the valve BCV to allow a sufficient outflow of fluid from the line 33. As soon as the swash plate $p$ has changed its angle sufficiently to affect matching of the flows between the pump and the motor(s), pressure will build up in the line 10 and therefore the line 35, to create the necessary retarding torque at the motor(s). This will immediately signal the valve BCV to start to close, reducing its orifice area and regulating the rate of adjustment of the pump swash plate angle. This initial closing movement of the valve spool 71 through the distance $x1$ may be designed to take place over the first 10% to 20% of the transmission pressure range in the closed loop system of the transmission. In the valve's normal mode of operation therefore the spool 71 would be displaced beyond a position in which the abutment plate 80 engages the abutment collar 81 and the both springs S1 and S2 are resisting the further displacement of the spool. At some limiting pressure approaching the peak pressure attainable in the closed loop system of the transmission, the valve spool 71 would be displaced the full distance $x2$.

To a first approximation, the retardation of the vehicle will be proportional to the rate of change of the volume displacement of the pump P. This for the particular type of pump P described is approximately proportional to the flow of fluid from the line 33 across the valve BCV. A constant flow of fluid across the valve BCV therefore regardless of pressure would produce approximately uniform rate of retardation of the vehicle. In principle, therefore, if the required retardation rate and variation can be predicted, the pressure/flow relationship of the valve BCV can be predicted and the valve orifice shape and the valve spring rates and so on designed accordingly. The use of two springs S1 and S2 may be regarded as a compromise for a more ideal single variable stiffness spring.

It will be understood that as so far described, the valve BCV acts automatically to regulate the system during braking of the vehicle on overrun. By depressing the brake pedal B the piston 87 will be displaced to the left in FIG. 10 so displacing the spool 71 and increasing the orifice area of the valve for the particular signal pressure acting in the line 35. The effect of this is to increase the retardation rate of the vehicle. The increased retardation achieved in turn raises the signal pressure and reduces the orifice area. A progressive braking effect can therefore be achieved by pressing on the brake pedal with an increasing force.

The valve shown in FIG. 10 may be used as the valve BCV1 in FIGS. 5 and 8 with suitable revised choice of spring rates and so on. In this case, the signal pressure supplied to the space 70 is derived from the servo cylinder S.

The transmission controls described have general application but are of particular interest to vehicle drives.

The transmissions may be applied to vehicle drives to provide one pedal control with the brake pedal B eliminated. The brake control valve is simply left to operate in its normal mode as an automatic regulating valve. By choosing the valve characteristics suitably, the degree of engine/transmission braking can be adjusted to that required for any particular application. Where the brake pedal B is eliminated, conventional friction brakes might be provided operating completely independently of the transmission control.

In regard to the engine requirements, an internal combustion piston engine driving the pump P and the booster pump might have a simple hand throttle set by the operator to suit the duty in hand and a simple governor to maintain a nominally constant engine speed set by the hand throttle.

The engine throttle could be linked directly in with the accelerator A and the engine tuned to peak efficiency over a narrow governed speed range if desired.

Advantages of the hydrostatic transmission controls as described may be summarized as follows.

The inclusion of a forward-neutral-reverse valve D ensures freedom from creep problems when neutral is selected.

The neutral position of such a selector valve can allow for the excess boost pump flow to be connected back to drain at a low fixed pressure via the main pump casing. This provides for main pump cooling during long periods of tick-over or non-use of the transmission when other work is being performed by the engine in an industrial vehicle application. It also renders the pump control mechanism inoperative for safety while it is not needed.

The variable boost pressure is in accordance with the requirements of the closed loop hydraulic circuit of the transmission.

The variation in the boost pressure gives lowest pressure when the excess flow returned to drain is maximum and highest pressure when the excess flow is minimum. The power absorbed by the boost flow is therefore maintained at a minimum.

At rest, in neutral, the boost pressure is at a minimum.

A variety of engine/transmission control connections can be catered for depending upon the priorities of the particular machine in which they are required.

The control as applied via the boost circuit imposes no high pressure losses.

The mode of control is similar to a conventional two pedal automatic transmission.

The pedals give operator "feel" for greater control.

The control pedal connections are mainly by low pressure hydraulic piping.

The low pressure flows used by the controls simplifies the design of the valves from the point of view of sealing, contamination, sensitivity, orifice sizes, heat generation, pressure distortion and manufacturing accuracy.

The horse power taken from the engine when the system is in neutral is kept to minimum leaving maximum engine power available for other duties.

Where both the pump and the motor(s) may be of variable volume flow, no mechanical linkage is required to the motor(s) or between the pump and the motor(s). Both the pump and the motor(s) behave automatically.

A hydrostatic transmission in accordance with this invention, in any of its specific forms as hereinbefore described with reference to the accompanying drawings, has an acceleration control pedal which functions in the conventional manner of an accelerator. This is achieved using a variable volume displacement pump in combination with a fixed volume displacement motor or motors or a variable volume displacement pump in combination with a variable volume displacement motor or motors or again a fixed volume displacement pump in combination with a variable volume displacement motor or motors. Automatic braking on overrun, and progressive pedal braking, is also achieved.

In a hydrostatic transmission control in accordance with this invention, it is preferred to employ a variable volume displacement pump and to control the volume displacement of the pump to achieve the acceleration control since a minimum speed ratio of zero can then be obtained which provides for starting and stopping. This is not so if a variable volume displacement motor is used in combination with a fixed volume displacement pump.

I claim:

1. In a hydrostatic transmission comprising a main hydraulic pump and a hydraulic motor, one at least of which is a variable displacement device the volume displacement of which is variable by the adjustment of a control member associated with the device, the hydraulic motor being connected to be driven by hydraulic fluid under high pressure delivered by said pump, the motor having an output drive shaft to provide the output torque from the transmission, said pump and said motor being connected in a closed loop system, there being a hydraulic fluid output line connecting the output side of said pump to said motor to deliver the high pressure working fluid to said motor and a hydraulic fluid return line connecting said motor to the return side of said pump to return to the pump hydraulic fluid under low pressure exhausting from said motor, and a booster pump connected to withdraw hydraulic fluid from a hydraulic fluid reservoir and to deliver same to said closed loop system to make up any hydraulic fluid leakage from said closed loop system, the improvement comprising an accelerator for said output drive shaft, said accelerator being displaceable to vary the maximum delivery pressure of hydraulic fluid attainable by said main hydraulic pump, and control means for automatically adjusting said control member to maintain the pressure of hydraulic working fluid delivered by said main hydraulic pump substantially constant at the maximum value determined by the setting of said accelerator in any particular setting thereof throughout the flow range of said variable displacement device from its minimum flow condition to its maximum flow condition whereby the torque of said output shaft increases with displacement of said accelerator to increase the maximum delivery pressure of hydraulic fluid attainable by said main hydraulic pump and the torque of said output shaft decreases with displacement of said accelerator to decrease the maximum delivery pressure of hydraulic fluid attainable by said main hydraulic pump.

2. A transmission as claimed in claim 1 wherein the control means comprises an automatic constant pressure controller to maintain said control member in such a position that the pump output pressure of said main hydraulic pump is matched to a reference pressure determined by the load of a control spring, the control spring loading being adjustable by said accelerator.

3. A transmission as claimed in claim 1 including braking means for said output drive shaft, said braking means being operable to influence the positioning of said control member, an overrun of said output drive shaft, to vary the volume displacement of said variable displacement device as a function of the low pressure of delivery of hydraulic fluid by said main hydraulic pump to said motor, thereby to provide a braking effect on said drive shaft.

4. A transmission as claimed in claim 3 wherein said braking means comprises a spring loaded braking valve in said closed loop system between said main hydraulic pump and said motor, said braking valve being operable to impose a variable restriction on the flow of hydraulic fluid in said closed loop system.

5. A transmission as claimed in claim 3 wherein said braking means comprises means biasing said control member towards a position in which the volume displacement of said main hydraulic pump is at a minimum relative to the volume displacement of said motor when the pressure of hydraulic fluid delivered to said motor by said main hydraulic pump falls below the input pressure of hydraulic fluid returned to the main hydraulic pump from said motor.

6. A transmission as claimed in claim 1 wherein the control means comprises a variable pressure valve to control the boost pressure of hydraulic fluid delivered to said closed loop system by said booster pump, the setting of said variable pressure valve being adjustable by said accelerator, and control actuator means to adjust said control member in response to the boost pressure to maintain the output pressure of said main hydraulic pump substantially proportional thereto, said control actuator means comprising servo means powered by the boost flow of hydraulic fluid delivered by said booster pump and discharging said fluid to said reservoir.

7. A transmission as claimed in claim 6 wherein the said variable displacement device is said main hydraulic pump which is of the axial piston swash plate type having a swash plate providing for increase in volume flow of the pump with increase in swash plate angle with respect to a plane normal to the axes of the pump pistons and vice versa, the swash plate constituting said control member, spring means is provided acting on the swash plate in the sense to move the swash plate to a zero angle in which the volume flow of the main hydraulic pump is zero, said servo means is a servo motor connected to adjust the angle of the swash plate in accordance with the boost pressure in the sense to increase the volume flow of said main hydraulic pump as the boost pressure increases and the swash plate is pivoted off centre so that the pump piston forces act on the swash plate in the sense to reduce the volume flow of said main hydraulic pump.

8. A transmission as claimed in claim 6 wherein said variable displacement device is said main hydraulic pump which is of the axial piston swash plate type having a swash plate providing for increase in volume flow of the pump with increase in swash plate angle with respect to a plane normal to the axes of the pistons of the pump and vice versa, the swash plate constituting said control member, spring means is provided acting on the swash plate in the sense to move the swash plate to a zero angle in which the volume flow of said main hydraulic pump is zero, said servo means is a first servo motor connected to adjust the angle of the swash plate in accordance with the boost pressure in the sense to increase the volume flow of said main hydraulic pump as the boost pressure increases and a further hydraulic servo motor is connected to adjust the angle of the swash plate in accordance with the pressure developed on the high pressure side of said main hydraulic pump in the sense to decrease the volume flow of said main hydraulic pump as the pressure on the high pressure side of the main hydraulic pump increases.

9. A transmission as claimed in claim 6 wherein said variable displacement device is said main hydraulic pump, spring means is provided acting on said control member to adjust said control member in the sense to reduce the volume flow of said main hydraulic pump and said servo means is a servo motor connected to adjust said control member in the sense to increase the volume flow of said main hydraulic pump, the servo motor having a differential servo piston having opposite end faces of different area, said servo piston being subject on its end face of smaller area to the pressure developed on the high pressure side of said main hydraulic pump.

10. A transmission as claimed in claim 6, including braking means for said output drive shaft, said braking means comprising a braking control valve to control the rate of discharge of hydraulic fluid from said servo means to said hydraulic fluid reservoir.

11. A transmission as claimed in claim 10 wherein said braking control valve is regulated by the pressure of fluid developed on the high pressure side of said closed loop system via a high pressure selector valve connected across said output and return lines, said braking control valve acting to reduce the rate of discharge of hydraulic fluid from said servo means to said reservoir as the pressure on the high pressure side of the main hydraulic pump is increased.

12. A transmission as claimed in claim 10 wherein said braking control valve is regulated by the pressure of fluid in said servo means, said braking control valve acting to reduce the rate of discharge of the hydraulic fluid from said servo means to said reservoir as the pressure of fluid in said servo means is increased.

13. A transmission as claimed in claim 11 wherein the pressure of fluid regulating said braking control valve acts on the valve against the force of spring means urging the valve to open, and the load of said spring means is subject to adjustment via a brake pedal the load of said spring means increasing as the brake pedal is depressed.

14. A transmission as claimed in claim 1 wherein said main hydraulic pump is operable to pump fluid in one direction only from the return side of said main hydraulic pump to the output side of said main hydraulic pump, said motor is reversible by reversing the direction of flow of hydraulic working fluid through said motor, and a change of direction valve is provided in said closed loop system between said main hydraulic pump and said motor to reverse the direction of flow of hydraulic working fluid through said motor.

15. A transmission as claimed in claim 1 wherein the main hydraulic pump is reversible to pump fluid in either direction and a change-direction lever mechanism is included between said control member and said accelerator.

16. A tranmission as claimed in claim 15 wherein the change-direction lever mechanism has different forward and reverse drive linkage ratios to allow for different forward and reverse drive characteristics.

17. A transmission as claimed in claim 1 wherein said variable displacement device is said main hydraulic pump, said motor is a variable volume displacement motor, and said control means acts also to adjust the volume displacement of said motor to maintain this at a maximum up to a maximum flow of hydraulic working fluid from said main hydraulic pump at any particular setting of said accelerator to accelerate a given load on said output drive shaft, said control means thereafter acting to reduce the volume displacement of said motor to enable said motor to continue to accelerate said load on said output drive shaft.

18. A transmission as claimed in claim 6 wherein said variable displacement device is said main hydraulic pump, said motor is of the axial piston swash plate type having a swash plate providing for increase in volume flow of said motor with increase in swash plate angle in respect to a plane normal to the axes of the pistons of said motor and vice versa, spring means is provided acting on the swash plate in the sense to move the swash plate to a maximum angle in which the volume flow of said motor is maximum, a first hydraulic servo motor is connected to adjust the angle of the swash plate in accordance with the pressure of fluid developed on the high pressure side of said closed loop system via a high pressure selector valve connected across said output and return lines in the sense to increase the volume flow of said motor and a further hydraulic servo motor is connected to adjust the angle of the swash plate in accordance with the pressure of the boost flow of hydraulic fluid acting in said servo means in the sense to decrease the volume flow of said motor as the pressure of fluid in said servo means increases, the arrangement being such that the volume displacement of said motor is maintained at a maximum up to a maximum flow of hydraulic working fluid from said main hydraulic pump at any particular setting of said accelerator to accelerate a given load on said output drive shaft, the volume displacement of said motor being thereafter reduced to enable said motor to continue to accelerate said load on said output drive shaft.

19. A transmission as claimed in claim 6 wherein said variable displacement device is said main hydraulic pump, said motor is of the axial piston swash plate type having a swash plate providing for increase in volume flow of said motor with increase in swash plate angle with respect to a plane normal to the axes of the pistons of said motor and vice versa, spring means is provided acting on the swash plate in the sense to move the swash plate to a maximum angle in which the volume flow of said motor is maximum, the swash plate is pivoted off centre so that said motor piston forces act on the swash plate in the sense to increase the volume flow of said hydraulic motor and a hydraulic servo motor is connected to adjust the angle of the swash plate in accordance with the pressure of the boost flow of hydraulic fluid acting in said servo means in the sense to decrease the volume flow of said motor as the pressure of fluid in said servo means increases, the arrangement being such that the volume displacement of said motor is maintained at a maximum up to a maximum flow of hydraulic working fluid from said main hydraulic pump at any particular setting of said accelerator to accelerate a given load on said output drive shaft, the volume displacement of said motor being thereafter reduced to enable said motor to continue to accelerate said load on said output drive shaft.

20. A transmission as claimed in claim 6 wherein said variable displacement device is said main hydraulic pump, said motor is a variable volume displacement hydraulic motor the volume displacement of which is variable by the adjustment of a motor control member associated with said motor, spring means is provided acting on said motor control member to adjust said control member in the sense to increase the volume flow of said motor and second servo means is provided having a differential servo piston having opposite end faces of different area the larger one of which is subject to the pressure of boost flow of hydraulic fluid acting in said first said servo means and operable to move said servo piston in a direction to adjust said motor control member to reduce the volume flow of said motor and the smaller one of which is subject to the pressure of fluid developed on the high pressure side of said closed loop system via a high pressure selector valve connected across said output and return lines and operable to move said servo piston in a direction to adjust said motor control member to increase the volume flow of said motor, the arrangement being such that the volume displacement of said motor is maintained at a maximum up to a maximum flow of hydraulic working fluid from said main hydraulic pump at any particular setting of said accelerator to accelerate a given load on said output drive shaft, the volume displacement of said motor being thereafter reduced to enable said motor to continue to accelerate said load on said output drive shaft.

21. A transmission as claimed in claim 7 including braking means for said output drive shaft, said braking means comprising a braking control valve to control the rate of discharge of hydraulic fluid from said servo means to said hydraulic fluid reservoir.

22. A transmission as claimed in claim 8 including braking means for said output drive shaft, said braking means comprising a braking control valve to control the rate of discharge of hydraulic fluid from said servo means to said hydraulic fluid reservoir.

23. A transmission as claimed in claim 9 including braking means for said output drive shaft, said braking means comprising a braking control valve to control the rate of discharge of hydraulic fluid from said servo means to said hydraulic fluid reservoir.

24. A transmission as claimed in claim 21 wherein said braking control valve is regulated by the pressure of fluid developed on the high pressure side of said closed loop system via a high pressure selector valve connected across said output and return lines, said braking control valve acting to reduce the rate of discharge of hydraulic fluid from said servo means to said reservoir as the pressure on the high pressure side of the main hydraulic pump is increased.

25. A transmission as claimed in claim 22 wherein said braking control valve is regulated by the pressure of fluid developed on the high pressure side of said closed loop system via a high pressure selector valve connected across said output and return lines, said braking control valve acting to reduce the rate of discharge of hydraulic fluid from said servo means to said reservoir as the pressure on the high pressure side of the main hydraulic pump is increased.

26. A transmission as claimed in claim 23 wherein said braking control valve is regulated by the pressure of fluid developed on the high pressure side of said closed loop system via a high pressure selector valve connected across said output and return lines, said braking control valve acting to reduce the rate of discharge of hydraulic fluid from said servo means to said reservoir as the pressure on the high pressure side of the main hydraulic pump is increased.

27. A transmission as claimed in claim 12 wherein the pressure of fluid regulating said braking control valve acts on the valve against the force of spring means urging the valve to open, and the load of said spring means is subject to adjustment via a brake pedal, the load of said spring means increasing as the brake pedal is depressed.

28. A transmission as claimed in claim 6 wherein said variable displacement device is said main hydraulic pump, said motor is a variable volume displacement motor, and said control means act also to adjust the volume displacement of said motor to maintain this at a maximum up to a maximum flow of hydraulic working fluid from said main hydraulic pump at any particular setting of said accelerator to accelerate a given load on said output drive shaft, said control means thereafter acting to reduce the volume displacement of said motor to enable said motor to continue to accelerate said load on said output drive shaft.

29. A transmission as claimed in claim 11 wherein said variable displacement device is said main hydraulic pump, said motor is a variable volume displacement motor, and said control means acts also to adjust the volume displacement of said motor to maintain this at a maximum up to a maximum flow of hydraulic working fluid from said main hydraulic pump at any particular setting of said accelerator to accelerate a given load on said output drive shaft, said control means thereafter acting to reduce the volume displacement of said motor to enable said motor to continue to accelerate said load on said output drive shaft.

30. A transmission as claimed in claim 10 wherein said braking control valve is regulated by the pressure of fluid in said servo means, said braking control valve acting to reduce the rate of discharge of the hydraulic fluid from said servo means to said reservoir as the pressure of fluid in said servo means is increased.

31. A transmission as claimed in claim 30 wherein the pressure of fluid regulating said braking control valve acts on the valve against the force of spring means urging the valve to open, and the load of said spring means is subject to adjustment via a brake pedal, the load of said spring means increasing as the brake pedal is depressed.

* * * * *

UNITED STATES PATENT AND TRADEMARK OFFICE
CERTIFICATE OF CORRECTION

PATENT NO. : 4,077,212
DATED : March 7, 1978
INVENTOR(S) : Kenneth W.S. FOSTER

It is certified that error appears in the above-identified patent and that said Letters Patent are hereby corrected as shown below:

Column 14 (claim 3), line 65, after "said control member," change "an" to --on--.

Signed and Sealed this

First Day of August 1978

[SEAL]

Attest:

RUTH C. MASON
Attesting Officer

DONALD W. BANNER
Commissioner of Patents and Trademarks